Nov. 8, 1960 J. J. FICEK 2,959,387
HOLDER FOR FLOWER BASKET OR FLOWER VESSEL
Filed Nov. 6, 1959
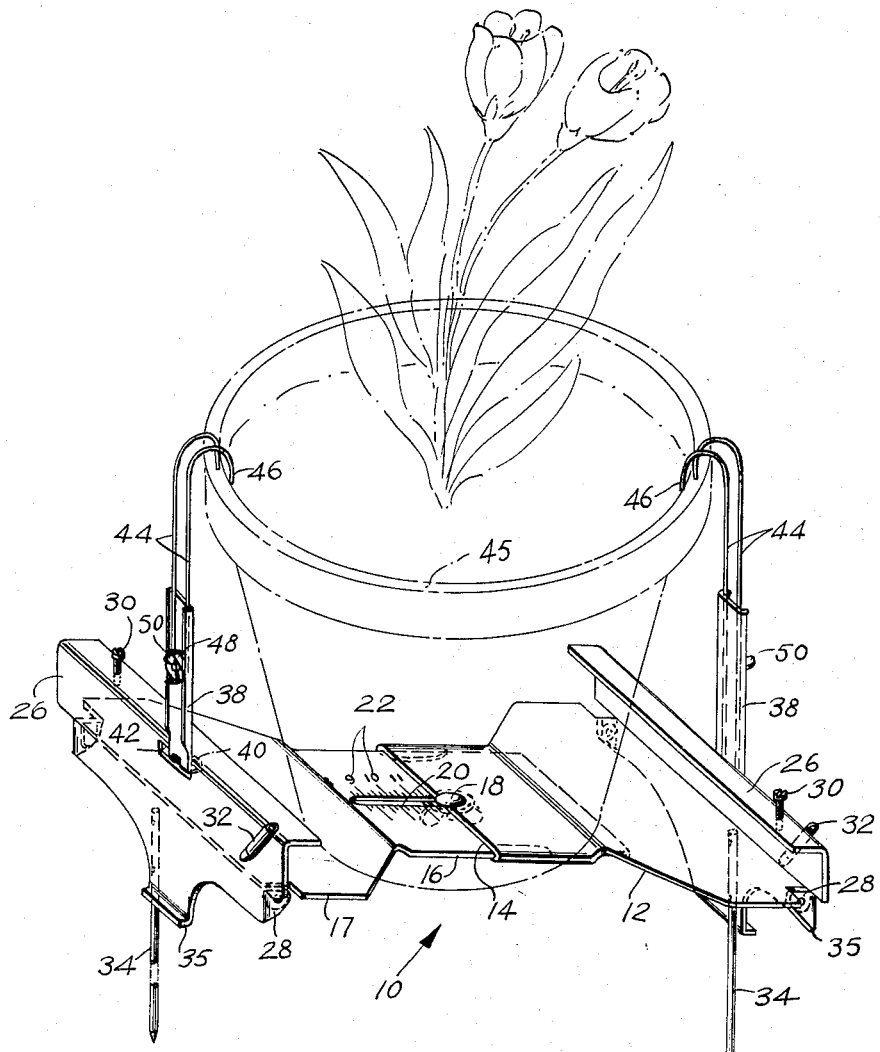
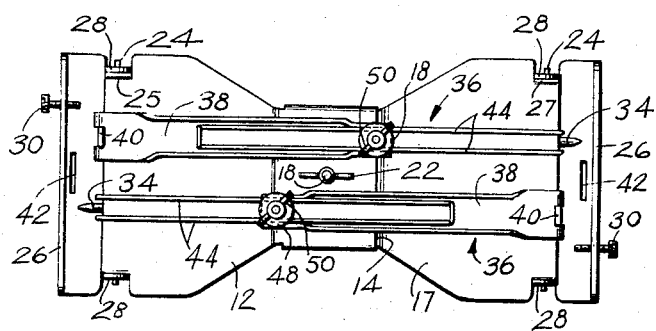
INVENTOR.
JOHN J. FICEK

United States Patent Office 2,959,387
Patented Nov. 8, 1960

2,959,387

HOLDER FOR FLOWER BASKET OR FLOWER VESSEL

John J. Ficek, McAdoo, Pa., assignor of one-tenth to Gadget-Of-The Month Club, Inc., North Hollywood, Calif., a corporation of California Filed Nov. 6, 1959, Ser. No. 851,478

5 Claims. (Cl. 248—149)

This invention relates to holders and, more particularly to a holder for supporting a flower basket or other flower vessel in an upright position.

It is an object of the present invention to provide a stable and wind resistant holder for supporting any type of flower vessel upon the ground that is completely adjustable to accommodate a flower supporting vessel of any desired size.

A further object of the present invention is to provide a flower basket holder of the above type which will support the flower vessel in vertically spaced relationship with the supporting ground level, thus preventing damage to the grass or other covering upon the ground over which it is supported.

Other objects of the invention are to provide a holder for flower basket or flower vessel bearing the above objects in mind which is of simple construction, has a minimum number of parts, is inexpensive to manufacture, and efficient in operation.

For other objects and for a better understanding of the invention, reference may be had to the following detailed description taken in conjunction with the accompanying drawing, in which:

Figure 1 is a perspective view of a holder made in accordance with the present invention in actual use;

Figure 2 is a bottom plan view of the assembly shown in Figure 1 in a disassembled storage position.

Referring now more in detail to the drawing, a holder 10 made in accordance with the present invention is shown to include a pair of cooperating plates 12, 17, one of which is provided with a channelway 14 that slidably receives a tongue 16 of the other such plate so as to provide an adjustable base upon which a flower supporting vessel 45 may be supported. A bolt 18 carried by the channel defining plate 12 extends through a longitudinal slot 20 in the slide plate 16, and threadedly supports a wing nut 22 upon its opposite end for selectively clamping the plates in any desired adjusted position, as indicated by the markings 22, thus enabling the base to be adjusted to accommodate a flower supporting vessel of any size.

A pair of side plates 26, each having a pair of depending ears 28, is pivotally connected by means of a hinge pin 24 to correspondingly shaped and apertured ears at the opposite end of the base plates 12, 17. The uppermost web of each side plate 26 is provided with a screw 30 that may be threaded downwardly into engagement with the base of a flower basket should such be supported upon the base plates, thus providing a clamping engagement therewith. Angularly inclined tubular members 32 slidably receive the lower end of the staffs of a flag, to further decorate the flower arrangement.

Each side plate 26 is further provided with a depending ground engaging stake 34, thus providing means for supporting the base plates 12, 17 in vertically spaced relationship above the level of the ground on which it is supported. Depending feet 35 limit the downward movement of the side plates relative to the ground, thus assuring an air space beneath the base plates 12, 17, through which air and light may pass.

A pair of detachable vessel retaining brackets are also provided, each such bracket including a channel plate 38 having an outwardly extending retaining tab 40 that may be received within a correspondingly shaped slot 42 in each side plate. A formed wire bracket 44 having a hook portion 46 formed at one end, is slidably carried upon the channel plate 38 by means of a bolt, washer 48, and wing nut 50, thus enabling the height of the hook portions 46 to be adjusted relative to the base plates 12, 17, to engage the periphery of a flower or plant supporting vessel 45, as shown in Figure 1.

It will now be recognized that a basket may be mounted directly upon the base plates 12, 17, with the ends of the base of the basket being received within the channels formed by the end plates 26, and clamped thereto by engagement of the screws 30. On the other hand, a pot or other type of vessel 45 may be supported centrally upon the plates 12, 17 by the hook shaped portions 46 of the side plate brackets, in the manner hereinbefore described. Since the distance between the side plates 26 may be readily adjusted, as may be the height of the hook engaging portions 46, this device may be used to hold any flower supporting vessel of any desired size and shape. When not in use, the side brackets are removed from the side plates, while the side plates are rotated about their hinge pins 24, as shown in Figure 2. Thus, the device can be stored in a small space in a convenient manner when not in actual use.

While various changes may be made in the detail construction, it shall be understood that such changes shall be within the spirit and scope of the present invention as defined by the appended claims.

What I claim as new and desire to protect by Letters Patent of the United States is:

1. A flower basket holder comprising, in combination, a base, a pair of side arms pivotally mounted upon opposite ends of said base, depending ground engaging support means carried upon each one of said side arms, and releasable vessel retaining means carried upon each of said side arms and extending in a direction opposite from said support means.

2. The combination according to claim 1, wherein said base comprises a pair of base plates, one of said base plates defining a channelway, and the other one of said plates having a slide plate slidably received within said channelway for adjustable sliding movement.

3. The combination according to claim 2, wherein said support means comprises a pair of ground engaging stakes, one of said stakes being secured to each one of said side arms.

4. The combination according to claim 3, wherein said side arms comprise a pair of angle plates having a web overlying and defining a channelway with said base plates, and a screw threadedly carried by each said web of said side arms for threaded engagement into pressure securing relationship with the base of a flower supporting basket carried upon said base plates.

5. The combination according to claim 4, wherein said retaining means comprises a pair of side brackets releasably carried upon said side arms, each one of said side brackets including an extensible hook engaging portion for releasable engagement with the marginal portions of a flower supporting vessel.

References Cited in the file of this patent

UNITED STATES PATENTS

| | | |
|---|---|---|
| 2,112,155 | Haney | Mar. 22, 1938 |
| 2,515,793 | Owens | July 18, 1950 |
| 2,743,893 | Johnston | May 1, 1956 |